(12) United States Patent
Harris et al.

(10) Patent No.: US 7,507,951 B2
(45) Date of Patent: Mar. 24, 2009

(54) TORSION OSCILLATOR VOLTAGE CONTROL DRIVER WITH EACH OF DUAL VOLTAGE POLARITY FOR EACH OF DUAL CHANNEL

(75) Inventors: Steven Jeffrey Harris, Lexington, KY (US); Martin Christopher Klement, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1015 days.

(21) Appl. No.: 11/002,377

(22) Filed: Dec. 2, 2004

(65) Prior Publication Data

US 2006/0119908 A1 Jun. 8, 2006

(51) Int. Cl.
*H01J 3/14* (2006.01)
(52) U.S. Cl. .................................. 250/234; 250/214 R
(58) Field of Classification Search ................. 250/234, 250/235, 216, 214 R; 347/259, 237, 243–247; 359/213, 223–226; 310/311, 316.01; 331/154, 331/155, 176; 235/462.2, 462.32
See application file for complete search history.

(56) References Cited

U.S. PATENT DOCUMENTS

| 4,264,809 | A |   | 4/1981  | Fearnside |
|-----------|---|---|---------|-----------|
| 4,317,611 | A |   | 3/1982  | Petersen |
| 4,344,677 | A |   | 8/1982  | Stuermer et al. |
| 4,630,223 | A |   | 12/1986 | Schoon |
| 4,686,363 | A |   | 8/1987  | Schoon |
| 4,797,749 | A |   | 1/1989  | Paulsen |
| 4,800,271 | A |   | 1/1989  | Blais |
| 5,258,699 | A | * | 11/1993 | Grodevant .................. 318/685 |
| 5,477,330 | A |   | 12/1995 | Dorr |
| 6,304,359 | B1|   | 10/2001 | Godhok |
| 2003/0021497 | A1 |   | 1/2003 | Kandori et al. |

\* cited by examiner

*Primary Examiner*—Que T Le

(57) ABSTRACT

A system for driving a torsion based on frequency, amplitude and offset control signals includes a pulse width modulator subsystem configured to generate output pulses having controlled pulse durations alternately to each of two channels, the output pulses encoding the frequency, amplitude and offset control signals. A driver circuit is configured for driving the torsion oscillator with a voltage of one polarity during a pulse output to the one of the channels, and a voltage of opposite polarity during a pulse output to the other of the channels.

7 Claims, 6 Drawing Sheets

TORSION OSCILLATOR VOLTAGE CONTROL DRIVER WITH EACH OF DUAL VOLTAGE POLARITY FOR EACH OF DUAL CHANNEL

BACKGROUND OF THE INVENTION

The invention relates generally to torsion oscillators, also termed resonant galvanometers, as well as to bidirectional scanning and imaging apparatuses including such torsion oscillators, and, more particularly, to systems for driving torsion oscillators.

Torsion oscillators which include an oscillating mirror may be employed in bidirectional scanning and imaging devices, such as laser printers, as an alternative to a rotating polygonal mirror.

As disclosed in Klement U.S. patent application Ser. No. 10/093,754, filed Mar. 8, 2002, and published as No. US 2003/0169055 A1 on Sep. 11, 2003, titled "Torsion Oscillator Stabilization," a torsion oscillator having an oscillating mirrored surface may be employed as a laser scanner when a laser is directed at the oscillating mirrored surface. A scan path which corresponds to motion of the oscillating mirror is thereby defined. The mirror angle changes sinusoidally with respect to time at a certain amount of sweep or scan angle (termed amplitude), at a certain repetition rate (termed frequency) and with a potential lack of symmetry with respect to the using apparatus (termed median offset or simply offset). Amplitude, frequency and offset are stabilized and controlled for useful operation, employing feedback from sensors which sense the light beam at predetermined positions in the scan path. More particularly, amplitude, frequency and offset are controlled such that the time interval during which the scanned beam traverses an imaging window is kept constant, and the offset is kept constant.

SUMMARY OF THE INVENTION

In one aspect, the invention is embodied in a system for driving a oscillator based on frequency and amplitude control signals. The system includes a modulator subsystem configured to generate output pulses having controlled pulse durations alternately to each of two channels. These output pulses encode at least the frequency and amplitude control signals. A driver circuit is connected for driving the torsion oscillator with a voltage of one polarity during a pulse output to the one of the two channels, and with a voltage of opposite polarity during a pulse output to the other of the two channels. The modulator subsystem may generate pulses that encode frequency, amplitude and offset control signals.

In another aspect, the invention is embodied in a system for driving a torsion oscillator based on frequency, amplitude and offset control signals. The system includes a pulse width modulator subsystem configured to generate output pulses having controlled pulse durations alternately to each of two channels at an alternating frequency corresponding to the frequency control signal. The duration of output pulses generated to one of the two channels is controlled based on the amplitude control signal summed with the offset control signal, and the duration of output pulses generated to the other of the two channels is controlled based on the amplitude control signal summed with the negative of the offset control signal. A driver circuit is connected for driving the torsion oscillator with a voltage of one polarity during a pulse output to the one of the two channels, and with a voltage of opposite polarity during a pulse output to the other of the two channels.

In yet another aspect, the invention is embodied in a bidirectional imaging apparatus including a light source for generating a light beam, and a torsion oscillator having a reflective surface disposed in the path of the light beam for oscillating and scanning the light beam through a scan path including an imaging window occupying a portion of the scan path. The light beam is scanned across the imaging window in a forward direction and a reverse direction. Sensors are provided for sensing the position of the light beam in the scan path, and feedback controllers generate frequency, amplitude and offset control signals based on signals from the sensors. A pulse width modulator subsystem is configured to generate output pulses having controlled pulse durations alternately to each of two channels at an alternating frequency corresponding to the frequency control signal. The duration of output pulses generated to one of the two channels is controlled based on the amplitude control signal summed with the offset control signal, and the duration of output pulses generated to the other of the two channels is controlled based on the amplitude control signal summed with the negative of the offset control signal. A driver circuit is connected for driving the torsion oscillator with a voltage of one polarity during a pulse output to the one of the two channels, and with a voltage of opposite polarity during a pulse output to the other of the two channels.

DETAILED DESCRIPTION

Elements of the embodiment disclosed herein are disclosed in the above-referenced Klement U.S. patent application Ser. No. 10/093,754, filed Mar. 8, 2002, published as No. US 2003/0169055 A1 on Sep. 11, 2003; and in Bush et al U.S. patent application Ser. No. 10/329,084; the entire disclosures of which are hereby expressly incorporated by reference.

Figure 1:
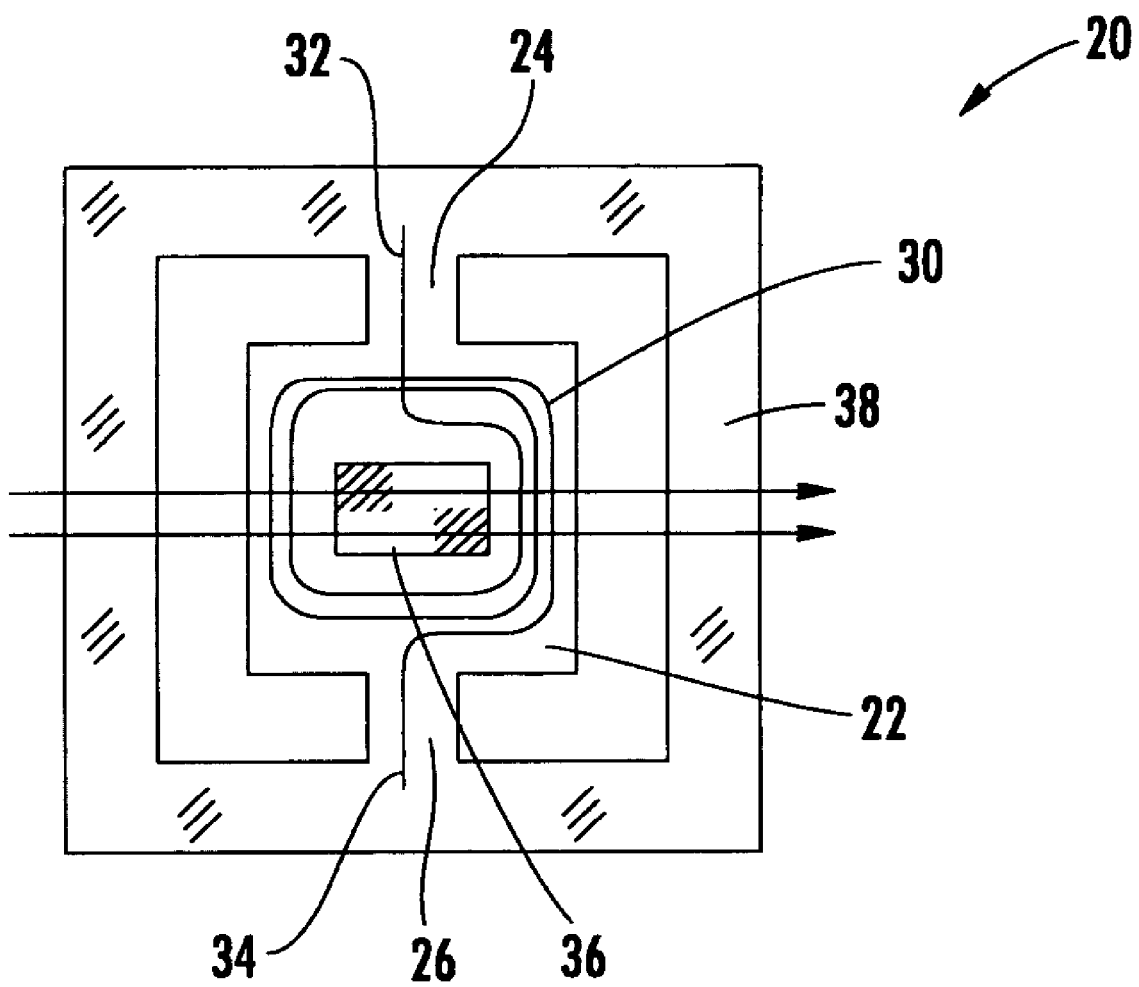
FIG. 1 is a schematic plan view of a representative torsion oscillator.

Referring to first to FIG. 1, a representative torsion oscillator 20, which also may be referred to as a resonant galvanometer 20, includes a central generally rectangular plate 22 suspended by two extensions 24 and 26 of the material of the plate 22. The extensions 24 and 26 also are integral with a surrounding frame 28. The plate 22 is generally symmetrical about its axis of oscillation, which axis is defined by the extensions 24 and 26. Typically, the plate 22, extensions 24 and 26, and frame 28 are cut or etched from a single silicon wafer. A coil 30 of an electrically conductive material and having terminals 32 and 34, and a reflective surface 36 such as a mirror 36 are placed on the central plate 22. Since silicon is itself about 60% reflective, the mirror 36 may simply be a smooth or polished surface region on the central plate 22. Typically, however, the mirror 36 is a deposited layer of material, such as gold, on a smooth silicon substrate. The central plate 22 and coil 30 are within a magnetic field, represented by arrows 38, produced by permanent magnets (not shown). Accordingly, when a current is driven through the coil 30, a force is exerted on the coil 30, which force is transferred to the plate 22. This force causes movement of the plate 22 about the axis defined by the extensions 24 and 26, which twist with reverse inherent torsion. Thus, rotational movement is created when electrical drive power (voltage and current) is applied to the coil 30. The spring rate of the extensions 24 and 26 and the mass of the central plate 22 comprise a rotational spring-mass system with a specific mechanical resonant frequency, resulting in an oscillating mirror 36. As one example, the mechanical resonant frequency is approximately 3.2 kHz. Typical maximum mechanical deflection is ±23°. In very general terms, the construction of the torsion oscillator 20 is such that motion of the central plate 20 and mirror 36 is controlled by the characteristics of the electrical drive power supplied to the torsion oscillator, in particular, to the coil 30 through connections to the terminals 32 and 34.

Figure 2:
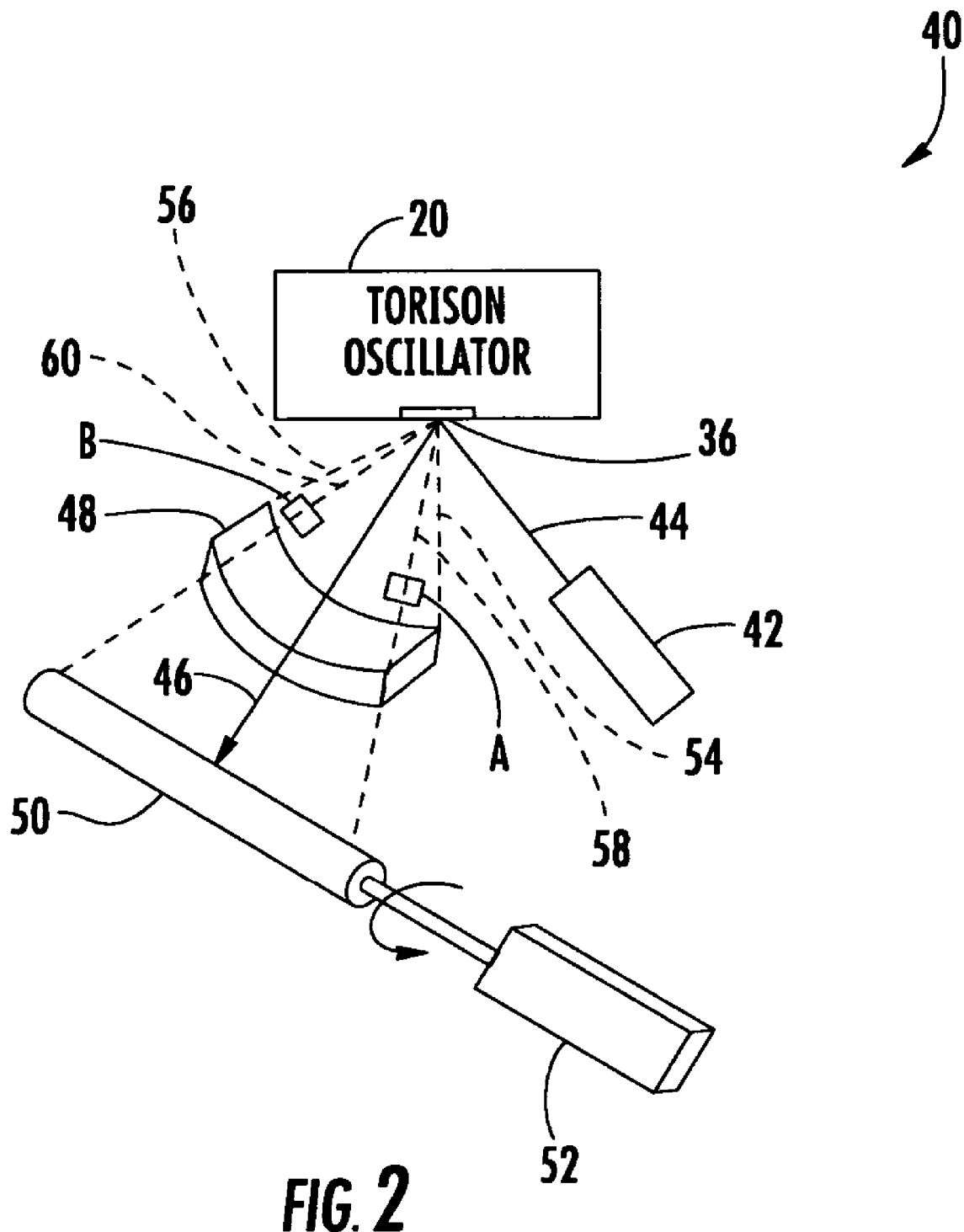
FIG. 2 is a schematic diagram of an imaging system including the torsion oscillator of FIG. 1.

FIG. 2 is a representation of a bidirectional imaging apparatus 40, such as a laser printer 40, including the torsion oscillator 20 of FIG. 1. In FIG. 2, a laser 42 directs a modulated light beam 44 onto the oscillating mirror 36 which is reflected to form a scanned beam represented by middle line 46. The scanned beam 46 is directed through an optical system 48 represented as a lens 48 and onto a rotating photoconductive drum 50 rotated at a controlled rate by a drive system 52.

The reflected light beam represented by the middle line 46 is scanned through a scan path having extremes or outer limits represented by dash lines 54 and 56. An imaging window defined by dash lines 58 and 60 is included within the scan path 54, 56. In the embodiment of FIG. 2, sensors A and B are located within the outer limits represented by the dash lines 54 and 56, more particularly, on the imaging window dash lines 58 and 60. The sensors A and B generate respective electrical signals when the reflected light beam passes the particular sensor. As disclosed in the above-incorporated application Ser. No. 10/329,084, there are a variety of locations where the sensors A and B may be positioned, either inside or outside the optical system represented by the lens 48.

Figure 3:
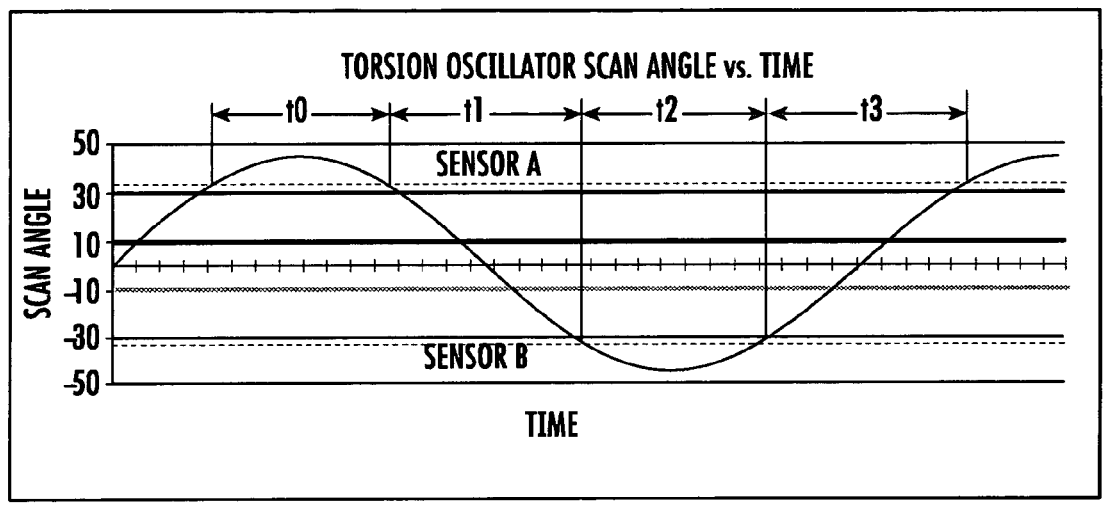
FIG. 3 is a plot of scan angle as a function of time.

FIG. 3 is a plot of scan angle, prior to optical correction, of the scanned beam 46, with time intervals referred to herein as t0, t1, t2 and t3. Time interval t1 corresponds to the time available for forward direction printing in a bidirectional laser printing imaging system, and time interval t3 corresponds to the time available for reverse direction printing in a bidirectional printing laser printer imaging system. The time intervals t0 and t3 thus correspond to the imaging window 58, 60 and are inherently equal. It is important to control time interval t1 (and thus time interval t3) in order to maintain a fixed line length in the laser printer 40 for a given oscillation frequency and a given optical system. Also, the optical system 48 represented by the lens 48 is designed to optically correct the slightly non-linear printing region of the sinusoidal scan angle into a linear scan along the photoconductive drum 50.

Relating FIG. 3 to the FIG. 2 sensors A and B, the beam first encounters sensor A, known to be located where the beam is at a predetermined scan angle a, corresponding to one end 58 of the imaging window. After the beam crosses angle a moving toward the outer limit 54, the beam is again sensed by sensor A as it returns. The interval between these two crossings of sensor A is time interval t0, which may be termed a "turnaround" interval. Forward direction printing time interval t1 then occurs, while the beam moves to be sensed by sensor B, known to be located where the beam is at scan angle b, corresponding to the other end 60 of the imaging window. After crossing angle b, the beam again is sensed by sensor B as it returns. The interval between these two crossings of sensor B is time interval t2, which is another "turnaround" interval. Then, reverse direction printing time interval t3 is the time between the second consecutive sensing of the beam by sensor B and the next sensing of the beam by sensor A, and the cycle repeats. Rotation from sensor A to sensor B may be referred to as direction AB, and corresponds to time interval t1. Rotation from sensor B to sensor may be referred to as direction BA, and corresponds to time interval t3.

The period is expressed as t0+t1+t2+t3, and the frequency of oscillation is the reciprocal of the period. The difference between t0 and t2 is a function of the location of the sensors A and B with respect to the median of the beam sweep and defines the median offset.

Thus, the midpoint of the sine wave of FIG. 3 is shifted from zero by a static offset S. Ideally, the torsion oscillator 20 would oscillate about a physical center position defined by line 46 in FIG. 2. However, due to various factors, including imbalances and structural variances, dynamic phenomena depending upon differences between the physical resonant frequency of the torsion oscillator 20 and the applied electrical driving frequency, and disturbances to the system such as mechanical shock, vibration or air flow, the torsion oscillator 20 typically oscillates about a center position that does not correspond to a physical center line.

Various control strategies may be employed as disclosed in the above-incorporated applications Ser. Nos. 10/093,754 and 10/329,084. In general terms, the construction of the torsion oscillator 20 is such that motion of the oscillating mirror 36 and thus movement of the scanned beam is controlled by characteristics of the electrical drive power supplied to the coil 30.

Briefly, for a given oscillation frequency, either the scanning time interval t0 or the scanning time interval t3 is measured, and a feedback controller develops a drive power amplitude control signal to maintain either t1 or t3 at a desired constant. In addition, the difference between t0 and t2 (e.g., t2−t0) is measured or calculated, and another feedback controller develops an offset control signal to maintain a constant offset. A constant scan interval (t1 or t3) together with a constant offset (t2−t0) maintains the imaging window 58, 60 portion of the scan angle sine wave used for printing (i.e., between the locations of sensors A and B) in a fixed location.

Figure 4:
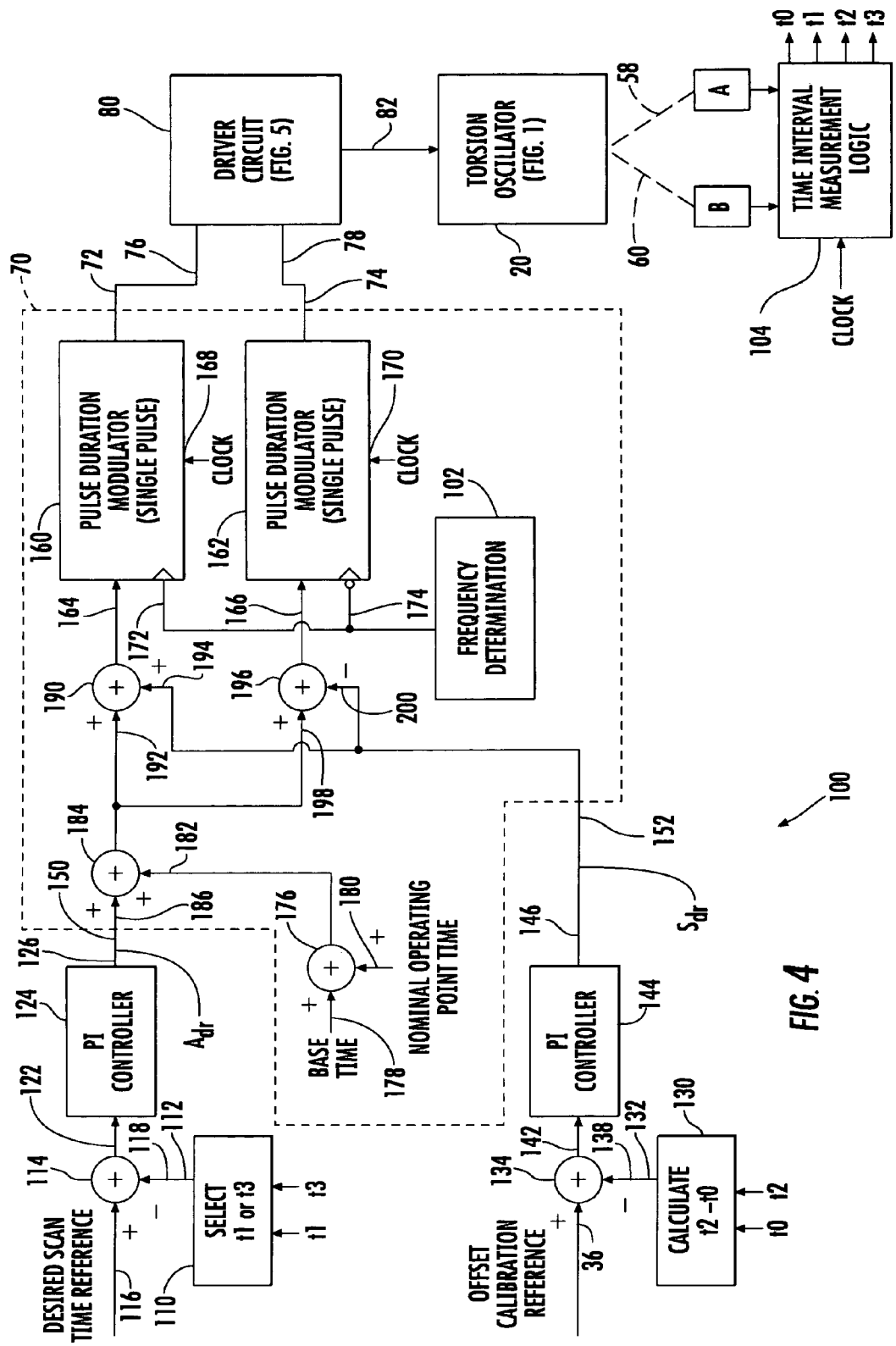
FIG. 4 is a schematic block diagram of apparatus employing the torsion oscillator of FIGS. 1 and 2, including feedback controllers for driving the torsion oscillator.

FIG. 4 is a schematic block diagram of apparatus embodying the invention and employing the torsion oscillator 20 of FIG. 1. It will be appreciated that the system of FIG. 4 also represents a bidirectional imaging apparatus such as the bidirectional imaging apparatus 40 of FIG. 2. However, for simplification, certain elements depicted in FIG. 2, such as the lens 48 and photoconductive drum 50 are omitted from FIG. 4.

Briefly and in overview, a pulse width modulator subsystem 70 is configured to generate an output pulse having a controlled pulse duration to each of two channels alternately at an alternating frequency corresponding to the driver frequency ($f_{dr}$) control signal. Pulses output to one of the two channels, which for convenience herein are termed positive pulses, have a duration or on time tA. Pulses output to the other of the two channels, which for convenience herein are termed negative pulses, have a duration or on time tB. The pulse width modulator subsystem 70 accordingly has two outputs 72 and 74 corresponding to the two channels, connected to respective inputs 76 and 78 of a driver circuit 80 described in detail hereinbelow with reference to FIG. 5. The duration tA of output pulses generated to the one of the two channels (in the disclosed embodiment the positive pulses corresponding to output 72) is controlled based on the driver amplitude ($A_{dr}$) control signal summed with the driver offset ($S_{dr}$) control signal. The duration tB of output pulses generated to the other of the two channels (in the disclosed embodiment the negative pulses corresponding to output 74) is controlled based on the driver amplitude ($A_{dr}$) control signal summed with the negative of the driver offset ($S_{dr}$) control signal. Thus the output pulses generated by the pulse width modulator subsystem 70 together encode the driver frequency, amplitude and offset control signals. The driver circuit 80 has an output 82 represented as a single line in FIG. 4 connected for driving the torsion oscillator 20, in particular the coil 30 thereof, with a voltage of one polarity during a pulse output to the one of said two channels, and with a voltage of opposite polarity during a pulse output to the other of said two channels.

More particularly, the amplitude of the resulting torsion oscillator 20 mechanical oscillation is obtained by employing feedback to control the durations tA and tB of the positive and negative pulses. The offset of the motion used to control t2−t0 in FIG. 3 is obtained by employing feedback to maintain a difference in the durations or on times, tA and tB, of the positive and negative pulses. For example, if the positive pulse is on for time tA, and the negative pulse is on for time tB, the nominal offset would be zero if tA−tB=0. If tA−tB≠0 then the torsion oscillator 20 is driven harder in one direction than the other and the resulting mechanical oscillation is around a position offset from the zero or nominal position. Thus the average of the pulse durations, $$\left(\frac{tA+tB}{2}\right),$$

controls the amplitude of the mechanical oscillation, and the difference in the pulse durations, (tA−tB), controls the offset of the mechanical oscillation from a zero or nominal midpoint. As described hereinbelow, a microprocessor/ASIC combination can be employed to implement the calculation of the times t1 and t2−t0 to generate the necessary pulse durations, tA and tB for the particular torsion oscillator 20 unit. In the implementation disclosed herein, the pulse durations, tA and tB, are subdivided into three time elements for calculation purposes. A base time is established by design. A nominal operating point time is added to the base time, and then a control adder is calculated from the feedback of the t1 and (t2−t0) times. This control adder time can be either positive or negative. For an exemplary 3.2 kHz torsion oscillator driven at a maximum ±23 mechanical degrees of deflection, the base time is 15 μS, the nominal operating point adder is 15 μS, and the control adder is ±15 μS. Thus the time duration tA or the time duration tB is 30 μS±15 μS or a maximum of 45 μS to a minimum of 15 μS.

Also represented in FIG. 4 are elements of control logic, generally designated 100. Although some elements are represented as functional blocks in FIG. 4, various control logic 100 elements may comprise any type of logic system, and may be implemented in software executing in one or more microprocessors, application specific integrated circuits (ASICs), programmable logic such as a field programmable gate array (FPGA), or other electronic devices. In a typical implementation, the control logic 100 includes the pulse width modulator subsystem 70. The control logic 100 develops the frequency ($f_{dr}$), amplitude ($A_{dr}$) and offset ($S_{dr}$) control signals based on feedback from the A and B sensors, employing techniques disclosed in the above-incorporated patent application Ser. Nos. 10/093,754 and 10/329,084, and described briefly hereinbelow.

Figure 5:
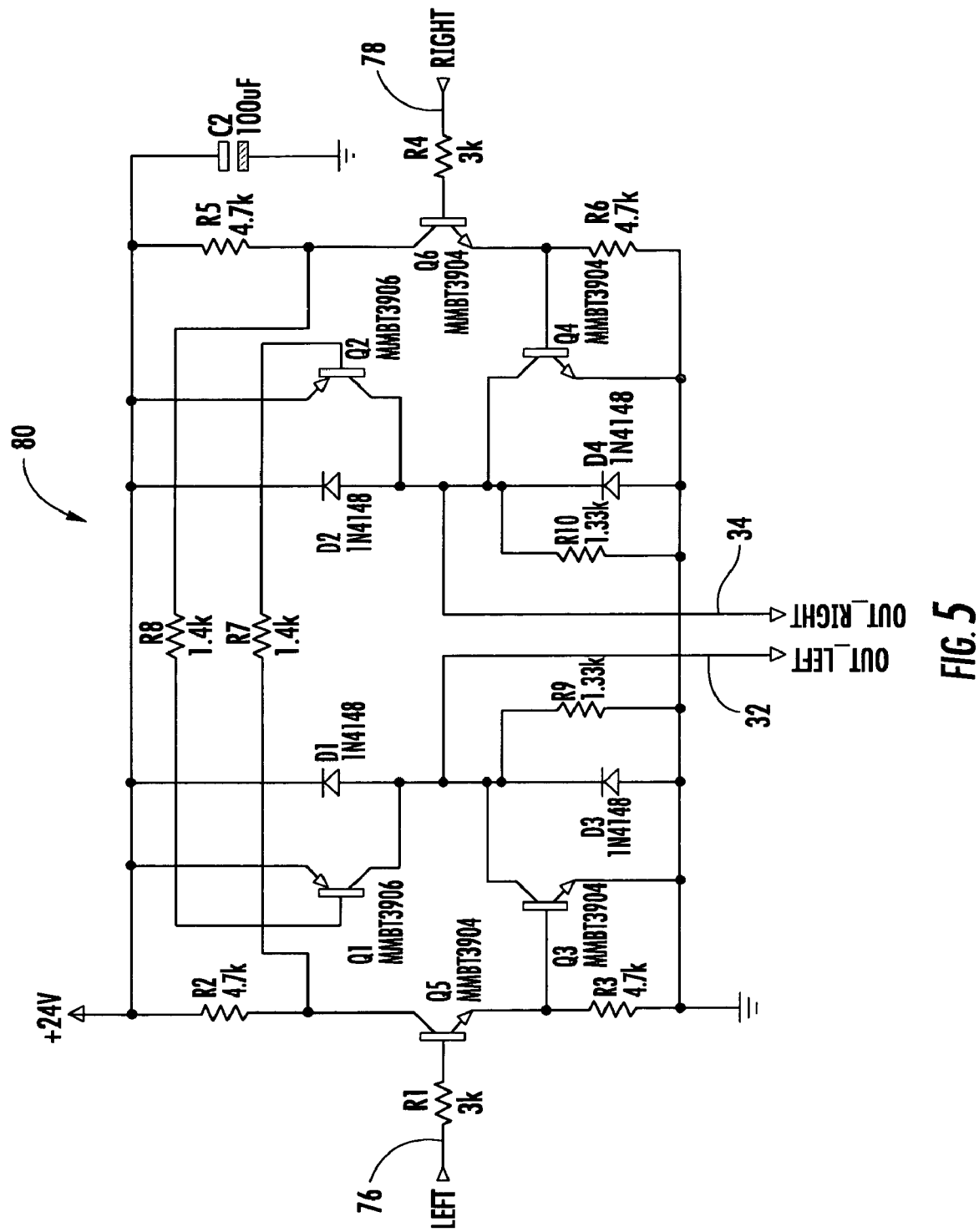
FIG. 5 is an electrical schematic circuit diagram of a driver circuit.

Advantageously, the embodiment disclosed herein, including the control logic 100 and the FIG. 5 driver circuit 80 requires only two single-ended DC power supplies, of ±24 volts (+24V or V+) and +3.3 volts (+3.3V), each referenced to circuit ground.

Considering the control logic 100 of FIG. 4 in greater detail, a frequency determination block 102 generates a signal which represents and which may generally be termed the driver frequency control signal ($f_{dr}$) or alternatively a driver period signal at the output 103 of the frequency determination block 102. The signal at the output 103 is typically a digital number representing the driver period, with an equivalent resolution of approximately 0.1 Hz. During typical operation, after the driver frequency ($f_{dr}$) has initially been determined as described in the above-incorporated patent applications, the frequency is held constant, and it is the driver amplitude ($A_{dr}$) and driver offset ($S_{dr}$) control signals which are determined based on feedback.

Briefly considering the determination of the driver amplitude control signal ($A_{dr}$), as part of one feedback loop, a block 110, which has an output 112, selects either the time interval t1 (corresponding to forward direction printing) or the time interval t3 (corresponding to reverse direction printing). Referring to the lower right corner of FIG. 4, all time intervals are determined by logic 104, which receives or internally generates a clock signal and also receives sensor signals A and B. Based on these signals, the logic 104 generates output signals T0 through t3 in accordance with the description above in reference to FIG. 3. An adder 114 has a (+) input 116 to which is connected a reference voltage $V_{ref}$ which represents a desired scan time. The adder 114 also has a (−) input 118 which receives the measured t1 or t3 time interval from block 110. At the output 120 of the adder 114 is a $V_{error}$ signal which is connected to the input 122 of a Proportional plus Integral (PI) controller 124. At the output 126 of the PI controller 124 is the driver amplitude control signal ($A_{dr}$). The PI feedback controller 124 may be implemented in software.

Briefly considering the determination of the driver offset control signal ($S_{dr}$), as part of another feedback loop, a block 130 determines or calculates the difference between intervals t0 and t2, generating the measured value of t2−t0 at its output 132. The difference between these two "turnaround" intervals t0 and t2 is thus measured offset, and can have either a positive or a negative value. An adder 134 has a (+) input 136 which receives an offset calibration reference $V_{ref}$ which may be determined either by adjustment or by an automatic power-on calibration routine. The adder 134 also has a (−) input 138 which receives the measured t2−t0 signal from block 130. The output 140 of the adder 134 is an error signal $V_{error}$, which is connected to the input 142 of another Proportional plus Integral (PI) controller 144. The output 146 of the PI controller 144 is the offset control signal ($S_{dr}$) which likewise may be a digital value representing offset information. The offset control signal ($S_{dr}$) can have either a positive or a negative value, depending upon the measured relationship of the "turn around" time intervals t0 and t2. Likewise, the PI feedback controller 144 may be implemented in software.

The driver amplitude control signal ($A_{dr}$) output 126, the driver offset ($S_{dr}$) control signal output 146 and the driver frequency ($f_{dr}$) control signal output 103 are connected to respective control inputs 150, 152 and 103 of the pulse width modulator subsystem 70 which, based on these inputs, generates the pulses having controlled pulse durations on the two channels represented by the outputs 72 and 74, which pulses encode the driver frequency, amplitude and offset control signals.

In FIG. 4, a simplified representation of the pulse width modulator subsystem 70 includes first and second pulse duration modulators 160 and 162 which respectively generate what are herein termed the positive and negative pulses having respective durations tA and tB. A particular topology, particularly of adders, is shown in FIG. 4 for convenience of illustration. It will be appreciated, however, that there are numerous functionally equivalent alternatives.

In the exemplary embodiment, the first and second pulse duration modulators 160 and 162 are conventional, and have respective pulse duration control inputs 164 and 166, which receive signals in the form of representative numerical values indicating the durations tA and tB of the pulses to be generated. Each of the pulse duration modulators 160 and 162 includes a counter which counts high frequency clock pulses, for example 240 MHz, applied to respective clock inputs 168 and 170. The pulse duration modulators 160 and 162 also have respective trigger inputs 172 and 174. In FIG. 4, the trigger input 172 of the first pulse duration modulator 160 is represented as a positive edge triggered input, and the trigger input 174 of the second pulse duration modulator 162 is represented as a negative edge triggered input. Each of the pulse duration modulators 160 and 162, when triggered, by counting the clock pulses generates a single pulse having a duration tA or tB determined based on the number presented at its respective pulse duration control input 164 or 166.

The FIG. 4 pulse width modulator subsystem 70 includes an adder 176 having a pair of (+) inputs 178 and 180 which respectively receive a number representing the base time (e.g. 15 µS) and a number representing the nominal operating point time (e.g. 15 µS). The output of the adder 176 is connected to a (+) input 182 of an adder 184, which has another (+) input 186 which receives a signal or number representing the driver amplitude control signal ($A_{dr}$).

The positive pulses generated by the first pulse duration modulator 160 have a duration tA controlled based on the driver amplitude control signal ($A_{dr}$) summed with the driver offset control signal ($S_{dr}$). Accordingly, a first adder 190 has its output connected to the pulse duration control input 164 of the first pulse duration modulator 160. The first adder 190 has a (+) input 192 connected to the output of the adder 184, and thus receives a signal or numerical value based on the driver amplitude control signal ($A_{dr}$), as well as another (+) input 194 connected to receive the signal or number representing the driver offset control signal ($S_{dr}$).

The negative pulses generated by the second pulse duration modulator 162 have a duration tB controlled based on the driver amplitude control signal ($A_{dr}$) summed with the negative of the driver offset control signal ($S_{dr}$). Accordingly, a second adder 196 has its output connected to the pulse duration control input 166 of the second pulse duration modulator 162. The second adder 196 has a (+) input 198 connected to the output of the adder 184, and thus receives a signal or numerical value based on the driver amplitude control signal ($A_{dr}$). The second adder 196 has a (−) input connected to receive the signal or number representing the driver offset control signal ($S_{dr}$). Since input 200 is a (−) input, in effect it is the negative of the offset control signal ($S_{dr}$) which is summed.

Figure 6:
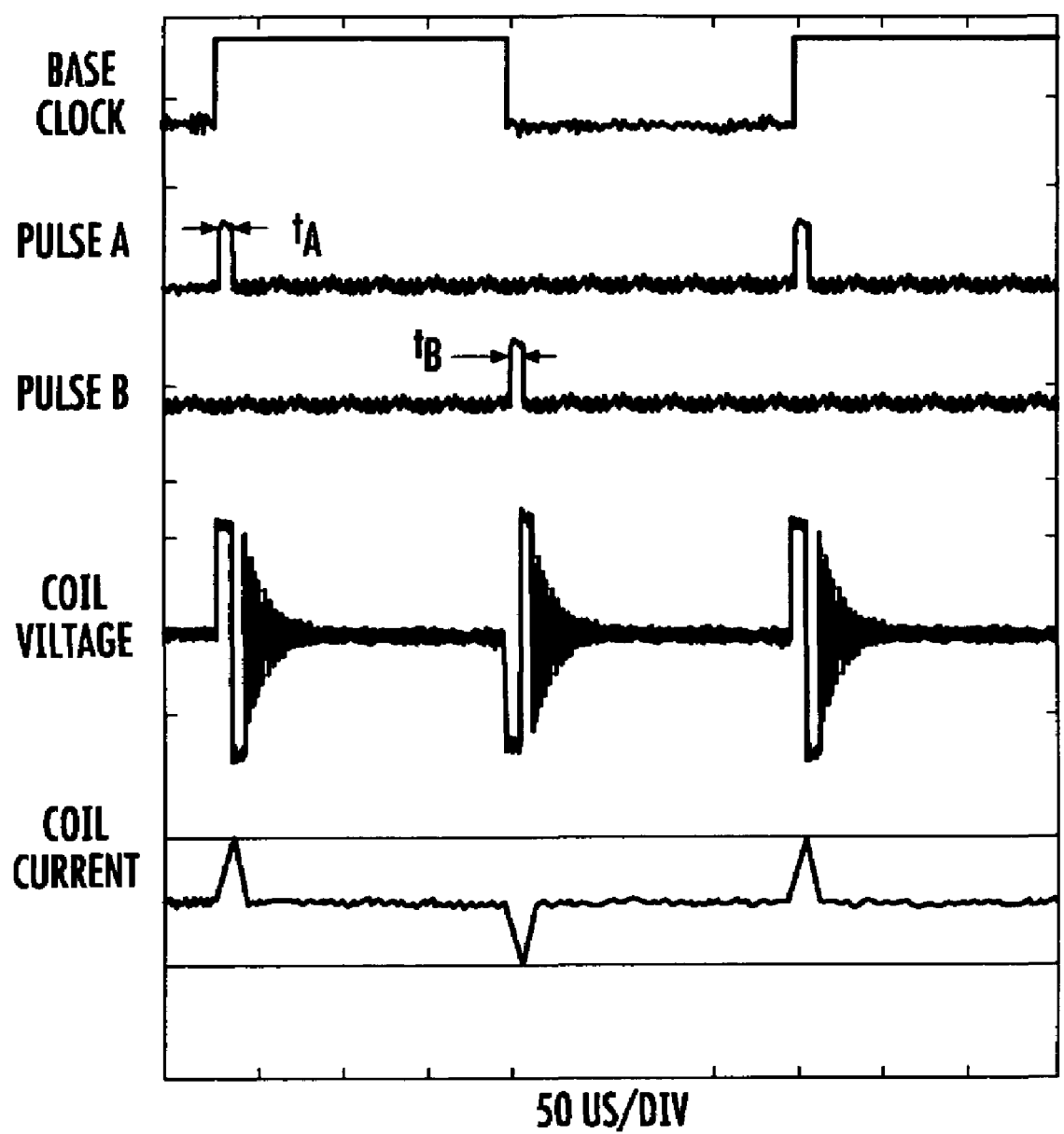
FIG. 6 shows various signal waveforms during operation.

With reference to FIG. 5, the driver circuit 80 is implemented as a modification to a standard H-driver, such as is conventionally employed to drive stepper motors, as an example. In FIG. 5, the coil 30 of the torsion oscillator 20 is represented as an electrical model 30'. This electrical model more particularly includes an inductor L6 (2.5 mH) in series with a resistor R19 (30 Ohm), with a capacitor C13 (23 pF) in parallel with the combination of L6 and R19. One channel is represented in FIG. 5 by input 72. When a pulse is applied to input 72, a voltage of one polarity is applied to the coil modeled at 30' in one direction, herein termed a positive pulse. When a pulse input is applied to the other channel represented at 74, a voltage is applied to the coil modeled at 30' in the opposite direction, herein termed a negative pulse. Typical coil voltage and current responses are shown in FIG. 6 for corresponding input pulses A and B having durations tA and tB respectively. When each pulse is turned off, the coil 30 voltage experiences a large overshoot followed by ringing due to the release of energy stored in the inductance of the coil 30. In FIG. 6, the "Base Clock" signal represents the driver frequency ($f_{dr}$), in this example 3.2 kHz. "Pulse A" and "Pulse B" are the alternating pulses received from the first and second pulse duration modulators 160 and 162 (FIG. 4). Each "Pulse A" is on a rising edge of the "base clock," and each "pulse B" is triggered on a falling edge of the "base clock."

The FIG. 5 driver circuit 80 more particularly includes a pair of NPN pre-drive transistors Q5 and Q7, and respective driver transistor pairs Q2, Q3 and Q1, Q4 connected in a bridged configuration. For transistors Q5 and Q7, type number 2N222A/ZTX is suitable. The power transistors Q1 and Q2 are PNP transistors, such as type number MPS6523, having their emitters connected to the +24 volt supply. The power transistors Q3 and Q4 are NPN transistors, such as type number 2N222A/ZTX, having their emitters connected to circuit ground.

Some modifications to a standard H-drive circuit have been made to improve performance. First, the PNP transistor base resistors R41 and R42 (1400 Ohm each) are included to stabilize the base currents of Q1 and Q2. Second, snubber resistors R22 and R23 (1.33K Ohm each) are included to reduce the ringing at the shut off of the current to the torsion oscillator drive coil 30. The NPN transistor pre-driver base resistors R2 and R3 are selected to be 3K Ohms to ensure reliable saturation of transistors Q5 and Q7 respectively. Other component values are as follows: R4, R5, R6 and R7, 4.7 k Ohm each; R43, 0.01 Ohm; R25 and R29, both 9 K Ohm; R26 and $29, both 1 W Ohm; C14, 47 µF; and D1, D2, D3 and D4, 1N4148.

Considering the operation of the FIG. 5 circuit, a pulse of duration tA at input 74 provides a voltage at the base of pre-drive transistor Q5. This turns on transistor Q5 which places a voltage on the base of power transistor Q3, causing it to turn on, connecting the left end 32 of the torsion oscillator drive coil 30 to ground. At the same time, turning on Q5 causes a voltage to be applied to the base of drive transistor Q1 connecting the right end 34 of the torsion oscillator drive coil 30 to V+, +24 volts in the exemplary embodiment. Thus, when pulse A is on for time tA, current flows through the torsion oscillator drive coil model 30 from right to left in the orientation of FIG. 5. When pulse A is turned off and pulse B remains off, no current flows through the load coil once the shut off transients die out.

A pulse of duration tB at input 74, connected to the base of pre-drive transistor Q7, turns on transistor Q7, which places a voltage on the base of power transistor Q4 causing it to turn on thus connecting the right end of the torsion oscillator drive coil to ground. At the same time, turning on Q7 causes a voltage to be applied to the base of drive transistor Q2 connecting the left end of the torsion oscillator drive coil to V+, 24 volts in this case. Thus when pulse B is on for time tB, current will flow through the torsion oscillator drive coil from left to right as shown in FIG. 8. When pulse B is turned off and pulse A remains off, no current will flow through the load coil once the shut off transients die out.

While specific embodiments of the invention have been illustrated and described herein, it is realized that numerous modifications and changes will occur to those skilled in the art. It is therefore to be understood that the appended claims are intended to cover all such modifications and changes as follow in the true spirit and scope of the invention.

The invention claimed is:

1. A system for driving an oscillator based on control signals, comprising:
   a modulator subsystem configured to generate output pulses having controlled pulse durations alternately to each of two channels, the output pulses encoding at least frequency and amplitude control signals; and
   a driver circuit configured for driving the torsion oscillator with a voltage of one polarity during a pulse output to the one of said channels, and a voltage of opposite polarity during a pulse output to the other of said two channels.

2. The system of claims 1, which further comprises the modulator subsystem generating an offset control signal.

3. A system for driving a torsion oscillator based on frequency, amplitude and offset control signals, comprising:
   a modulator subsystem configured to generate output pulses having controlled pulse durations alternately to each of two channels at an alternating frequency corresponding to the frequency control signal;
   the duration of output pulses generated to one of said two channels being controlled based on the amplitude control signal summed with the offset control signal;
   the duration of output pulses generated to the other of said two channels being controlled based on the amplitude control signal summed with the negative of the offset control signal; and
   a driver circuit connected for driving the torsion oscillator with a voltage of one polarity during a pulse output to the one of said two channels, and with a voltage of opposite polarity during a pulse output to the other of said two channels.

4. The system of claim 3, wherein said modulator subsystem comprises:
   first and second pulse duration modulators each configured to generate, when triggered, a pulse having a controlled pulse duration; and
   a first adder connected to a pulse duration control input of said first pulse duration modulator, said first adder generating a first pulse duration control signal based on the amplitude control signal summed with the offset control signal;
   a second adder connected to a pulse duration control input of said second pulse duration modulator, said second adder generating a second pulse duration control signal based on the amplitude control signal summed with the negative of the offset control signal.

5. The system of claim 3, which further comprises a feedback controller for generating at least the amplitude and offset control signals.

6. A bidirectional imaging apparatus comprising:
   a light source for generating a light beam;
   a torsion oscillator having a reflective surface disposed in the path of the light beam for oscillating and scanning the light beam through a scan path including an imaging window occupying a portion of the scan path, the light beam being scanned across the imaging window in a forward direction and a reverse direction;
   sensors for sensing the position of the light beam in the scan path;
   feedback controllers for generating frequency, amplitude and offset control signals based on signals from said sensors;
   a pulse width modulator subsystem configured to generate output pulses having controlled pulse durations alternately to each of two channels at an alternating frequency corresponding to the frequency control signal;
   the duration of output pulses generated to one of said two channels being controlled based on the amplitude control signal summed with the offset control signal;
   the duration of output pulses generated to the other of said two channels being controlled based on the amplitude control signal summed with the negative of the offset control signal; and
   a driver circuit connected for driving the torsion oscillator with a voltage of one polarity during a pulse output to the one of said two channels, and with a voltage of opposite polarity during a pulse output to the other of said two channels.

7. The apparatus of claim 6, wherein said pulse width modulator subsystem comprises:
   first and second pulse duration modulators each configured to generate, when triggered, a pulse having a controlled pulse duration; and
   a first adder connected to a pulse duration control input of said first pulse duration modulator, said first adder generating a first pulse duration control signal based on the amplitude control signal summed with the offset control signal;
   a second adder connected to a pulse duration control input of said second pulse duration modulator, said second adder generating a second pulse duration control signal based on the amplitude control signal summed with the negative of the offset control signal.

* * * * *